United States Patent
Ojima et al.

(10) Patent No.: US 10,554,092 B2
(45) Date of Patent: Feb. 4, 2020

(54) ROTARY ELECTRIC MACHINE

(71) Applicant: Mitsubishi Electric Corporation, Tokyo (JP)

(72) Inventors: Koichi Ojima, Tokyo (JP); Naoki Ohashi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 401 days.

(21) Appl. No.: 14/891,394

(22) PCT Filed: Jun. 14, 2013

(86) PCT No.: PCT/JP2013/066484
§ 371 (c)(1),
(2) Date: Nov. 16, 2015

(87) PCT Pub. No.: WO2014/199516
PCT Pub. Date: Dec. 18, 2014

(65) Prior Publication Data
US 2016/0118858 A1 Apr. 28, 2016

(51) Int. Cl.
*H02K 5/20* (2006.01)
*H02K 9/00* (2006.01)

(52) U.S. Cl.
CPC .............. *H02K 5/20* (2013.01); *H02K 9/005* (2013.01)

(58) Field of Classification Search
CPC ............ H02K 5/20; H02K 9/005; H02K 9/19; H02K 15/14
(Continued)

(56) References Cited

U.S. PATENT DOCUMENTS 2,831,662 A * 4/1958 Hirsch ............... H02K 5/20
165/156
2,862,120 A * 11/1958 Onsrud ............... H02K 5/20
165/146
(Continued)

FOREIGN PATENT DOCUMENTS

CN 102394528 A 3/2012
DE 102012102406 A1 * 9/2013 ............... H02K 5/20
(Continued)

OTHER PUBLICATIONS

Then et al, Machine Translation of WO2006106086, Oct. 2006 (Year: 2006).*
(Continued)

*Primary Examiner* — Quyen P Leung
*Assistant Examiner* — Eric Johnson
(74) *Attorney, Agent, or Firm* — Sughrue Mion, PLLC; Richard C. Turner

(57) ABSTRACT

In the rotary electric machine according to the present invention, a first O-ring 13a is mounted between a pair of position regulating members 12 that are press-fitted onto and held in a vicinity of a second axial end of an outer circumferential surface of a stator core housing portion 10a so as to be spaced apart in an axial direction, and is pressed and held between the stator core housing portion 10a and a cylindrical portion 16, and a second O-ring 13b is mounted into an O-ring housing groove 11 that is recessed into an outer circumferential surface of a frame mounting portion 10b, and is pressed and held between the frame mounting portion 10b and the cylindrical portion 16, such that a coolant channel 22 is formed between the frame 10 and the cylindrical portion 16.

10 Claims, 5 Drawing Sheets

(58) Field of Classification Search
USPC .............................. 310/52, 54, 58, 59, 85–89
See application file for complete search history.

(56) References Cited

U.S. PATENT DOCUMENTS

| | | | | |
|---|---|---|---|---|
| 3,882,334 | A * | 5/1975 | Newill ..................... | H02K 9/19 310/59 |
| 4,692,644 | A * | 9/1987 | Lenz ........................ | H02K 9/19 228/193 |
| 9,570,959 | B2 * | 2/2017 | Kassler .................... | H02K 5/20 |
| 9,876,411 | B2 * | 1/2018 | Buttner .................... | H02K 5/20 |
| 2003/0222519 | A1 * | 12/2003 | Bostwick ................ | H02K 5/20 310/58 |
| 2008/0093135 | A1 * | 4/2008 | Nomura ................... | B60K 6/26 180/65.24 |
| 2008/0223557 | A1 * | 9/2008 | Fulton ..................... | H02K 5/20 165/104.33 |
| 2011/0025147 | A1 * | 2/2011 | Owng ..................... | H02K 5/18 310/63 |
| 2011/0080064 | A1 * | 4/2011 | Kudose ................... | H02K 5/04 310/89 |
| 2012/0217826 | A1 * | 8/2012 | Jiang ....................... | H02K 5/20 310/54 |
| 2013/0076166 | A1 * | 3/2013 | Chamberlin ............. | H02K 5/20 310/54 |
| 2013/0099606 | A1 * | 4/2013 | Inoue ...................... | H02K 9/193 310/43 |
| 2014/0111043 | A1 * | 4/2014 | Knappenberger ....... | H02K 5/04 310/65 |
| 2014/0117796 | A1 * | 5/2014 | Kassler .................... | H02K 5/20 310/54 |

FOREIGN PATENT DOCUMENTS

| | | |
|---|---|---|
| JP | 5-67166 U | 9/1993 |
| JP | 07-177697 A | 7/1995 |
| JP | 10-210702 A | 8/1998 |
| JP | 2006-282158 A | 10/2006 |
| JP | 2006-296005 A | 10/2006 |
| WO | 2006/054661 A1 | 5/2006 |
| WO | WO-2006106086 A1 * | 10/2006 ............... H02K 5/20 |

OTHER PUBLICATIONS

Communication dated Nov. 17, 2015 from the Japanese Patent Office issued in corresponding Japanese Application No. 2015-522372.

International Search Report for PCT/JP2013/066484 dated Sep. 17, 2013.

Communication dated Sep. 19, 2019 from the German Patent Office in application No. 112013007157.6.

* cited by examiner

ROTARY ELECTRIC MACHINE

CROSS REFERENCE TO RELATED APPLICATIONS

This application is a National Stage of International Application No. PCT/JP 2013/066484 filed Jun. 14, 2013, the contents of all of which are incorporated herein by reference in their entirety.

TECHNICAL FIELD

The present invention relates to a rotary electric machine in which a frame that holds a stator core internally is accommodated in a housing case, and particularly relates to a construction of a coolant channel that is formed between the frame and the housing case.

BACKGROUND ART

In conventional hybrid electric vehicle driving devices, such as that described in Patent Literature 1 for example, a motor casing that holds a stator internally is integrated by being joined to a housing of a transmission so as to have a joint end portion of an intermediate housing that is coupled to the engine interposed when fitted inside the intermediate housing. A first axial end of the motor casing is formed into a large diameter portion, a second axial end is formed into a small diameter portion, and O-ring housing grooves are respectively formed on outer circumferential surfaces of the large diameter portion and the small diameter portion. O-rings are housed in the O-ring housing grooves and are pressed and held between the motor casing and the intermediate housing, and a coolant channel is formed between the motor casing and the intermediate housing.

CITATION LIST

Patent Literture

Patent Literature 1: International Publication No. WO/2006/054661 (Pamphlet)

SUMMARY OF THE INVENTION

Problem to be Solved by the Invention

In conventional hybrid electric vehicle driving apparatuses, because the O-ring housing grooves are formed on two axial end portions of the outer circumferential surfaces of the motor casing, one problem has been that there are two positions to which machining processes are applied, increasing machining costs.

Another problem has been that the small diameter portions become thicker by an amount proportionate to a groove depth of the O-ring housing groove, increasing the material costs and weight of the motor casing. Here, the weight of the motor casing can be reduced by making the wall thickness of the small diameter portion thinner on portions other than the O-ring housing grooves, but a machining process is required to make the wall thickness thinner, increasing machining costs.

The present invention aims to solve the above problems and an object of the present invention is to provide a rotary electric machine that can reduce machining costs that accompany machining processes, and that can also reduce material costs and weight by omitting at least one O-ring housing groove that houses an O-ring that is mounted to a frame so as to be spaced apart in an axial direction.

Means for Solving the Problem

In order to achieve the above object, according to one aspect of the present invention, there is provided a rotary electric machine including: a stator that includes: a stator core; and a stator coil that is mounted to the stator core; a frame that holds the stator internally by fitting together with and fixing the stator core; a first O-ring and a second O-ring that are mounted to an outer circumferential surface of the frame so as to be spaced apart in an axial direction; and a housing case that houses the frame and the stator, the first O-ring and the second O-ring being pressed and held between the frame and the housing case such that a coolant channel is formed between the frame and the housing case. Axial movement of the first O-ring is restricted by a position regulating member that is constituted by a separate member from the frame.

Effects of the Invention

According to the present invention, because the position regulating member that restricts the axial movement of the first O-ring is constituted by a separate member from the frame, a machining process for forming an O-ring housing groove on an outer circumferential surface of the frame is no longer required, enabling machining costs to be reduced.

In addition, because it is not necessary to increase the thickness of the frame by an amount proportionate to the groove depth of the O-ring housing groove, the thickness of the frame can be made thinner, enabling the material costs of the frame to be reduced, and also enabling weight to be reduced.

DESCRIPTION OF EMBODIMENTS

Preferred embodiments of a rotary electric machine according to the present invention will now be explained with reference to the drawings.

Embodiment 1

Figure 1:
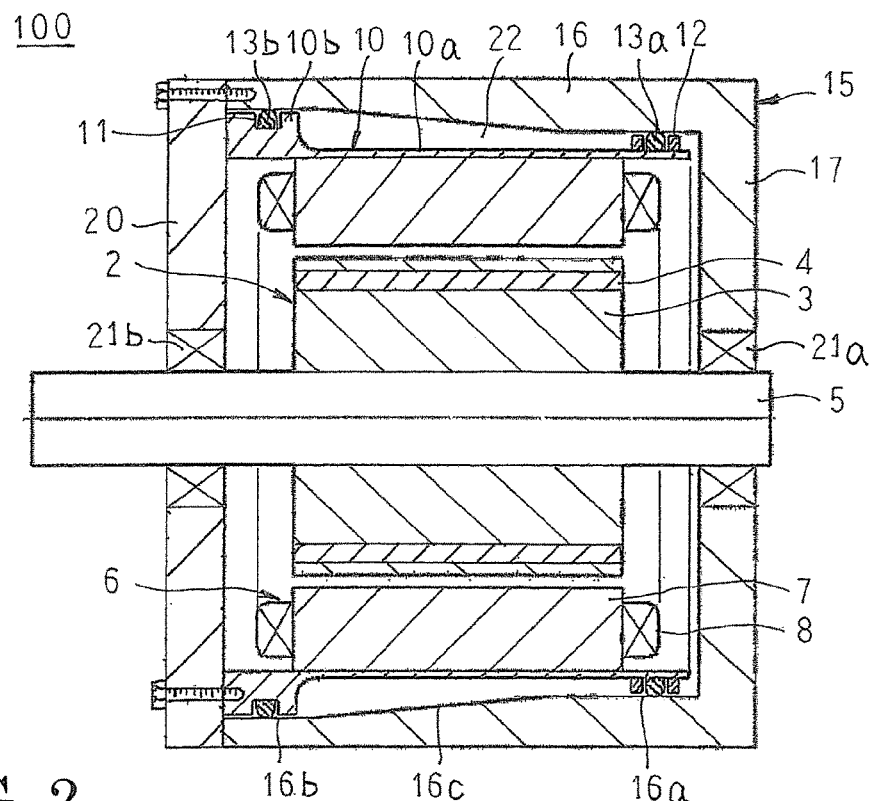
FIG. 1 is a cross section that shows a rotary electric machine according to Embodiment 1 of the present invention.

FIG. 1 is a cross section that shows a rotary electric machine according to Embodiment 1 of the present invention.

In FIG. 1, a rotary electric machine 100 includes: a rotor 2; a stator 6 that is disposed so as to surround the rotor 2; a frame 10 that holds the stator 6 internally; a housing case 15 that accommodates the rotor 2 and the stator 6 internally; and an end plate 20 that closes an opening of the housing case 15.

The rotor 2 includes: a rotor core 3 that is configured by laminating electromagnetic steel sheets, for example; permanent magnets 4 that are embedded near an outer circumferential surface of the rotor core 3 so as to extend axially so as to be disposed at a uniform angular pitch circumferentially; and a shaft 5 that is inserted through a central position of the rotor core 3, and that is fixed to the rotor core 3. Moreover, the permanent magnets 4 are mounted onto the rotor core 3 such that North-seeking (N) poles and South-seeking (S) poles line up so as to alternate circumferentially.

The stator 6 includes: an annular stator core 7 that is configured by laminating electromagnetic steel sheets, for example; and a stator coil 8 that is mounted onto the stator core 7.

The frame 10 is produced into a stepped cylindrical shape in which a wall thickness becomes thicker toward a first axial end in a stepped pattern by casting or forging using a ferrous material, for example, and includes: a cylindrical stator core housing portion 10a that has a uniform thickness; and a thick frame mounting portion 10b that is formed so as to extend to a first end of the stator core housing portion 10a. An axial length of the stator core housing portion 10a is longer than an axial length of the stator core 7. The stator 6 is held by the frame 10 by the stator core 7 being press-fitted into and fixed inside the stator core housing portion 10a.

An O-ring housing groove 11 is recessed into an outer circumferential surface of the frame mounting portion 10b of the frame 10. A pair of position regulating members 12 are produced into annular shapes using a ferrous material, for example, and are held on a second axial end of the outer circumferential surface of the stator core housing portion 10a by press-fitting in an externally fitted state so as to be spaced apart in an axial direction, to constitute a first position regulating portion. This first position regulating portion is disposed axially outside a region of the stator core housing portion 10a that houses the stator core 7 (the housing region of the stator core 7).

The housing case 15 is produced so as to have a floored cylindrical shape that includes a cylindrical portion 16 and a bottom portion 17 by die casting using aluminum, or an aluminum alloy, for example, as a material. A second end (a bottom portion end) of an inner circumferential surface of the cylindrical portion 16 of the housing case 15 is formed so as to have a first cylindrical surface 16a that has an inside diameter that is slightly larger than an outside diameter of the stator core housing portion 10a, and a first end (an opening end) is formed so as to have a second cylindrical surface 16b that has an inside diameter that is slightly larger than an outside diameter of the frame mounting portion 10b of the frame 10. An inclined surface 16c that joins the first cylindrical surface 16a and the second cylindrical surface 16b is formed between the first cylindrical surface 16a and the second cylindrical surface 16b. In addition, a bearing 21a is held at a central axial position of the bottom portion 17.

The end plate 20 is produced into a disk shape by die casting using aluminum, for example, as a material, and a bearing 21b is mounted at a central position.

To assemble a rotary electric machine 100 that is configured in this manner, the stator 6 is first mounted into the frame 10 such that the stator core 7 onto which the stator coil 8 is mounted is press-fitted into and fixed to the stator core housing portion 10b of the frame 10. Next, a first O-ring 13a is mounted between the pair of position regulating members 12, and a second O-ring 13b is mounted into the O-ring housing groove 11. Axial movement of the first O-ring 13a and of the second O-ring 13b is restricted thereby.

Next, the frame 10, onto which the stator 6 is mounted, is inserted into the cylindrical portion 16 of the housing case 15 from the opening end. Thus, the first O-ring 13a is pressed and held between the first cylindrical surface 16a and the outer circumferential surface of the stator core housing portion 10a, and the second O-ring 13b is pressed and held between the second cylindrical surface 16b and a bottom surface of the O-ring housing groove 11. A coolant channel 22 is formed thereby between the outer circumferential surface of the stator core housing portion 10a of the frame 10 and the inclined surface 16c of the cylindrical portion 16 of the housing case 15.

In addition, the rotor 2 is mounted to the end plate 20 by press-fitting a vicinity of a first axial end of the shaft 5 into the bearing 21b that is held by the end plate 20. Next, the rotor 2 that is mounted to the end plate 20 is inserted into the cylindrical portion 16 of the housing case 15 from the opening end. Then, a vicinity of the second end of the shaft 5 is press-fitted into the bearing 21a that is held by the bottom portion 17 of the housing case 15, and the end plate 20 is subsequently fixed by fastening to both an opening end surface of the cylindrical portion 16 of the housing case 15 and an opening end surface of the frame mounting portion 10b of the frame 10, to assemble the rotary electric machine 100.

A rotary electric machine 100 that is assembled in this manner is used as a motor of an automotive transmission, or as a generator, in a hybrid automobile or an electric automobile, for example.

In Embodiment 1, because a pair of position regulating members 12 are held on a second axial end of the outer circumferential surface of the stator core housing portion 10a by press-fitting so as to be spaced apart in an axial direction to constitute a first position regulating portion, it is not necessary to form an O-ring housing groove. Thus, the only position to which a machining process is applied is the outer circumferential surface of the frame mounting portion 10b, enabling machining costs to be reduced.

It is not necessary to form an O-ring housing groove on the stator core housing portion 10a. Thus, the wall thickness of the stator core housing portion 10a can be made thinner by an amount proportionate to the groove depth of the O-ring housing groove compared to a stator core housing portion on which an O-ring housing groove is formed, enabling the material costs and weight of the frame 10 to be reduced.

Because the frame 10 is produced using a ferrous material, the thermal expansion coefficient of the frame 10 can be set closer to the thermal expansion coefficient of the stator core 7, which is produced using magnetic steel sheets. Thus, when the stator 6 is generating heat during operation of the rotary electric machine 100, the generation of stresses that result from differences in thermal expansion between the stator 6 and the frame 10 can be reduced.

Embodiment 2

Figure 2:
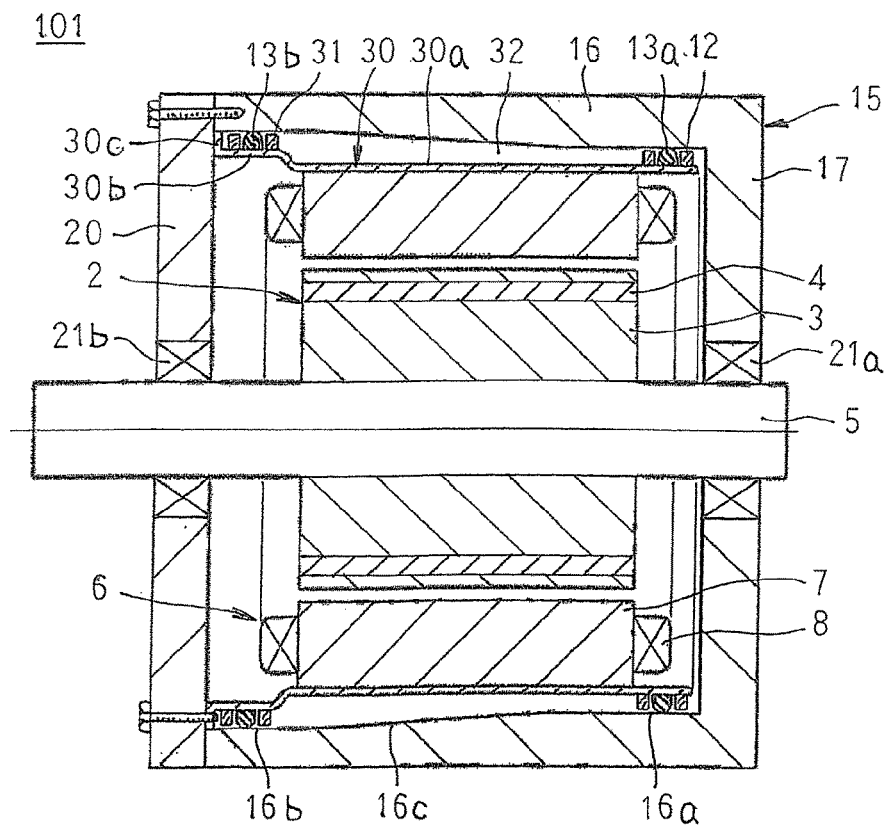
FIG. 2 is a cross section that shows a rotary electric machine according to Embodiment 2 of the present invention.

FIG. 2 is a cross section that shows a rotary electric machine according to Embodiment 2 of the present invention.

In FIG. 2, a frame 30 is produced into a stepped cylindrical shape that has uniform thickness in which an outside diameter becomes greater toward a first axial end in a stepped pattern using a ferrous material, for example, and includes: a cylindrical stator core housing portion 30a; a large diameter portion 30b that has a large diameter that is formed so as to extend to a first end of the stator core housing portion 30a; and a frame mounting portion 30c that extends radially outward from a first end of the large diameter portion 30b. An axial length of the stator core housing portion 30a is longer than an axial length of the stator core 7. The stator 6 is held by the frame 30 by the stator core 7 being press-fitted into and fixed inside the stator core housing portion 30a.

A pair of position regulating members 31 are produced into annular shapes using a ferrous material, for example, and are held on an outer circumferential surface of the large diameter portion 30b by press-fitting in an externally fitted state so as to be spaced apart in an axial direction, to constitute a second position regulating portion. This second position regulating portion is disposed axially outside a region of the stator core housing portion 30a that houses the stator core 7. A second O-ring 13b is mounted between the pair of position regulating members 31 such that movement in an axial direction is restricted.

Moreover, the rotary electric machine 101 according to Embodiment 2 is configured in a similar or identical manner to the rotary electric machine 100 according to Embodiment 1 above except that the frame 30 is used instead of the frame 10.

In this rotary electric machine 101, the frame 30, on which the first O-ring 13a is mounted between the pair of position regulating members 12 and the second O-ring 13b is mounted between the pair of position regulating members 31, is inserted into the cylindrical portion 16 of the housing case 15 from a vicinity of the opening. Thus, the first O-ring 13a is pressed and held between the first cylindrical surface 16a and the outer circumferential surface of the stator core housing portion 30a, and the second O-ring 13b is pressed and held between the second cylindrical surface 16b and the outer circumferential surface of the large diameter portion 30b. A coolant channel 32 is formed thereby between the outer circumferential surface of the stator core housing portion 30a of the frame 30 and the inclined surface 16c of the cylindrical portion 16 of the housing case 15.

In addition, the cylindrical portion 16 of the housing case 15 and the frame mounting portion 30c of the frame 30 are both fixed by fastening to the end plate 20.

According to Embodiment 2, a pair of position regulating members 12 are held in a vicinity of a second axial end of an outer circumferential surface of a stator core housing portion 30a by press-fitting so as to be spaced apart in an axial direction to constitute a first position regulating portion, and a pair of position regulating members 31 are held on an outer circumferential surface of a large diameter portion 30b by press-fitting so as to be spaced apart in an axial direction to constitute a second position regulating portion. Thus, because it is not necessary to form O-ring housing grooves by machining the outer circumferential surfaces of the stator core housing portion 30a and the large diameter portion 30b, the need for cutting processes is eliminated, enabling machining costs to be reduced.

Because it is not necessary to form O-ring housing grooves on the stator core housing portion 30a and the large diameter portion 30b, the wall thickness of the frame 30 can be made thinner, enabling the material costs and weight of the frame 30 to be reduced.

Because the frame 30 is formed so as to have a uniform thickness, the frame 30 can be produced using drawing or by a sheet rolling and welding method (welding after cylindrical bending), enabling machining costs of the frame 30 to be reduced.

Because the frame 30 is produced using a ferrous material, the thermal expansion coefficient of the frame 30 can be set closer to the thermal expansion coefficient of the stator core 7, which is produced using magnetic steel sheets. Thus, when the stator 6 is generating heat during operation of the rotary electric machine 101, the generation of stresses that result from differences in thermal expansion between the stator 6 and the frame 30 can be reduced.

Moreover, in Embodiment 2 above, a cylindrical portion of a housing case and a frame mounting portion of a frame are respectively fixed by fastening to an end plate, but a radial length of the frame mounting portion may be extended, and the frame mounting portion disposed between the cylindrical portion and the end plate, such that the frame mounting portion and the cylindrical portion are fixed together by fastening with the end plate.

Embodiment 3

Figure 3:
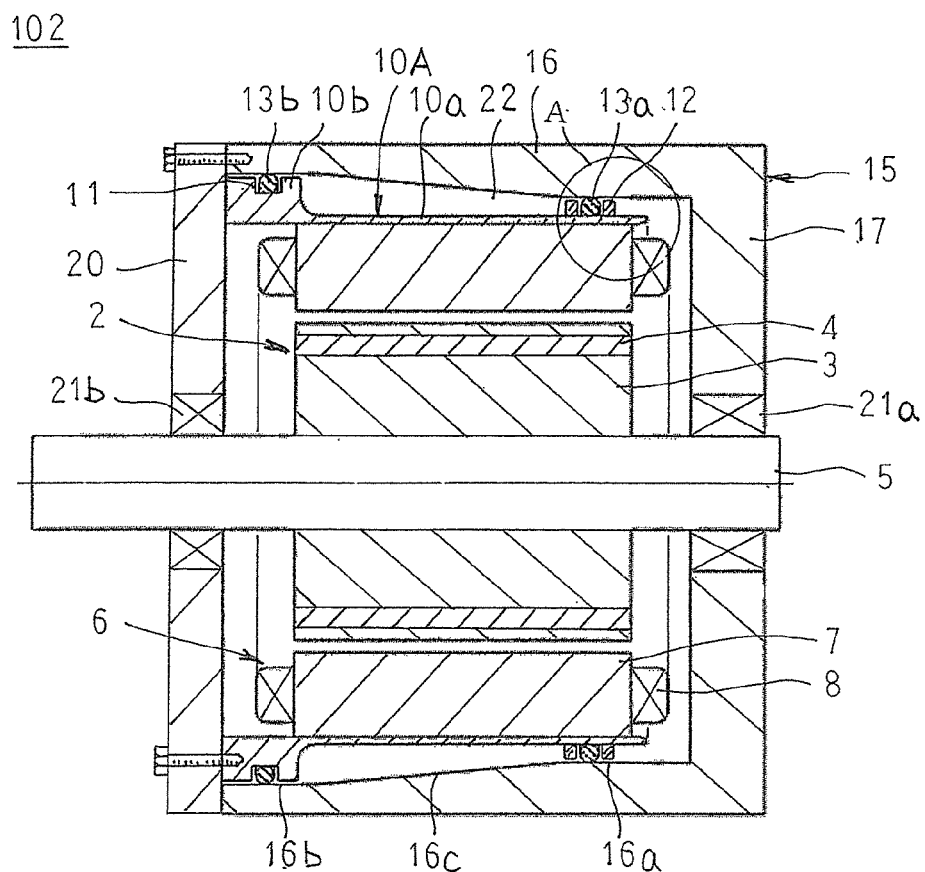
FIG. 3 is a cross section that shows a rotary electric machine according to Embodiment 3 of the present invention.
Figure 4:
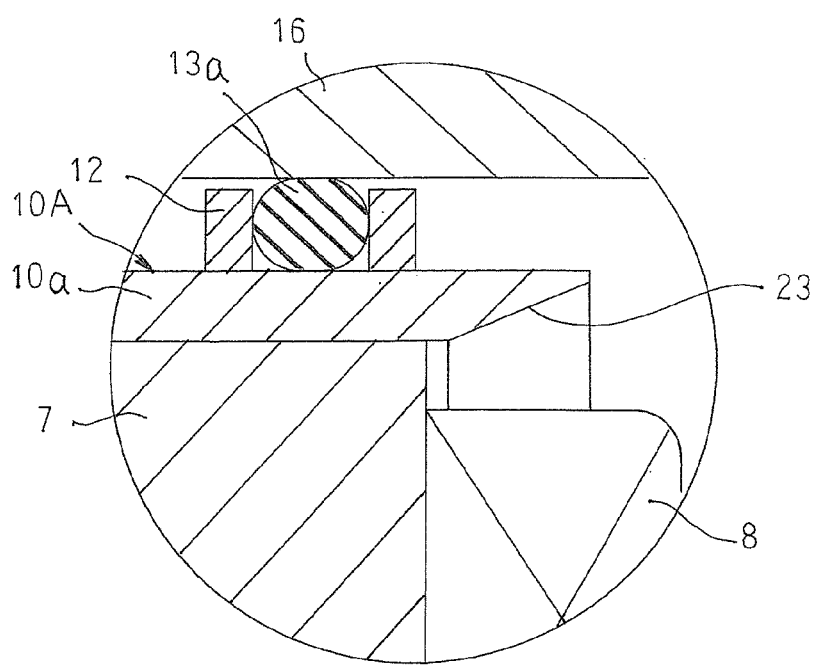
FIG. 4 is an enlargement of Portion A in FIG. 3.

FIG. 3 is a cross section that shows a rotary electric machine according to Embodiment 3 of the present invention, and FIG. 4 is an enlargement of Portion A in FIG. 3.

In FIGS. 3 and 4, a frame 10A includes a guiding portion 23 that is configured by forming an inner circumferential surface in a vicinity of a second axial end of a stator core housing portion 10a into an inclined surface in which an inside diameter increases gradually toward the second axial end. A pair of position regulating members 12 are mounted to the stator core housing portion 10a so as to be positioned radially outside a housing region of a stator core 7.

Moreover, the rotary electric machine 102 according to Embodiment 3 is configured in a similar or identical manner to the rotary electric machine 100 according to Embodiment 1 above except that the frame 10A is used instead of the frame 10.

In Embodiment 3, because a pair of position regulating members 12 are also held in a vicinity of a second axial end of an outer circumferential surface of a stator core housing portion 10a by press-fitting so as to be spaced apart in an axial direction to constitute a first position regulating portion, effects can be achieved in a similar or identical manner to Embodiment 1 above.

In Embodiment 3, a frame 10A includes a guiding portion 23 that is configured by forming a vicinity of a second axial end of an inner circumferential surface of a stator core housing portion 10a into a splayed inclined surface. Thus, the stator core 7 is guided by the inclined surface of the guiding portion 23, and is press-fitted into the stator core housing portion 10a after also being centered such that the central axis of the stator core 7 is aligned with the central axis of the stator core housing portion 10a by passing through a straight portion between the guiding portion 23 and the position regulating members 12 that has a thin wall thickness.

Here, because the portion of the stator core housing portion 10a between the guiding portion 23 and the position regulating members 12 has a thin wall thickness, rigidity is reduced. Thus, the stator core 7 that is guided and centered by the guiding portion 23 is press-fitted into the portion of the stator core housing portion 10a between the guiding portion 23 and the position regulating members 12, and is further centered in the process of reaching the portion to which the position regulating members 12 are mounted. The inner circumferential surface of the portion of the stator core housing portion 10a that extends from the guiding portion 23 to the position regulating members 12 constitutes a stator core press-fitting interfitting surface that has a centering action on the stator core 7.

Consequently, according to Embodiment 3, increases in press-fitting load that result from decentration between the stator core 7 and the stator core housing portion 10a are suppressed.

Because a pair of position regulating members 12 are mounted to the stator core housing portion 10a so as to be positioned radially outside a housing region of a stator core 7, the amount of protrusion of the stator core housing portion 10a from the housing region of the stator core 7 toward the second axial end can be shortened. The axial length of the stator core housing portion 10a can be reduced thereby, reducing material costs, and also enabling reductions in the size of the rotary electric machine 102.

Embodiment 4

Figure 5:
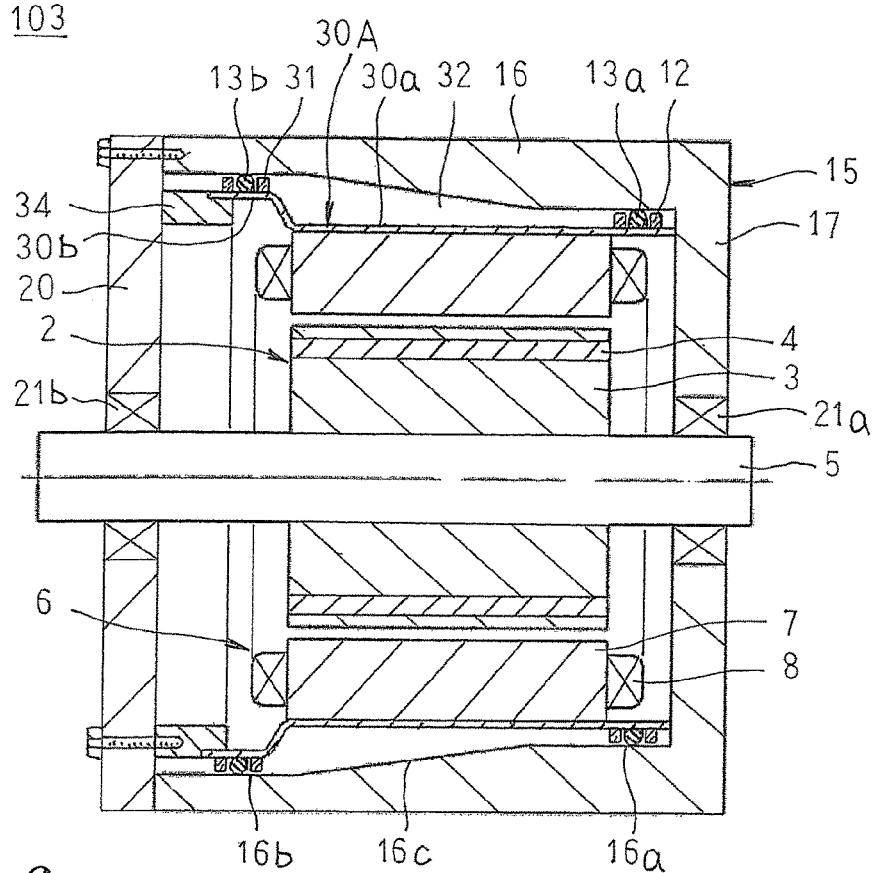
FIG. 5 is a cross section that shows a rotary electric machine according to Embodiment 4 of the present invention.

FIG. 5 is a cross section that shows a rotary electric machine according to Embodiment 4 of the present invention.

In FIG. 5, a frame 30A includes: a cylindrical stator core housing portion 30a; and a large diameter portion 30b that has a large diameter that is formed so as to extend to a first end of the stator core housing portion 30a. A frame mounting member 34 is produced into an annular shape that is thicker than the frame 30A, and is joined to the first axial end of the large diameter portion 30b by welding, etc. The frame 30A is held on the end plate 20 by the frame mounting member 34 being fixed by fastening to the end plate 20.

Moreover, the rotary electric machine 103 according to Embodiment 4 is configured in a similar or identical manner to the rotary electric machine 101 according to Embodiment 2 above except that the frame 30A is used instead of the frame 30.

In Embodiment 4, because a pair of position regulating members 12 are also held in a vicinity of a second axial end of an outer circumferential surface of a stator core housing portion 30a by press-fitting so as to be spaced apart in an axial direction to constitute a first position regulating portion, and a pair of position regulating members 31 are held on an outer circumferential surface of a large diameter portion 30b by press-fitting so as to be spaced apart in an axial direction to constitute a second position regulating portion, effects can be achieved in a similar or identical manner to Embodiment 2 above.

According to Embodiment 4, because a thick annular frame mounting member 34 is joined together with a first axial end of a large diameter portion 30b, rigidity of a frame 30A that includes a stator core housing portion 30a and a large diameter portion 30b that are formed so as to be thin walled is increased, enabling the stator 6 to be held firmly. The wall thickness of the frame 30A can be made thinner by an amount proportionate to the increase in rigidity due to joining the frame mounting member 34, enabling the frame 30A to be produced by drawing, and the frame mounting member 34 to be produced by forging and machining.

The frame mounting member 34 does not form a coolant channel 32. In other words, because the first and the second O-ring 13a and 13b are mounted to the frame 30A, and are not mounted to the frame mounting member 34, sealing performance is not required at the joint portion between the frame mounting member 34 and the large diameter portion 30b. Consequently, the joining between the frame mounting member 34 and the large diameter portion 30b is simplified.

Moreover, in Embodiment 4 above, the annular frame mounting member 34 is joined to the first axial end of the large diameter portion 30b, but a plurality of frame mounting members may be joined to the first axial end of the large diameter portion 30b so as to be spaced apart from each other circumferentially.

Embodiment 5

Figure 6:
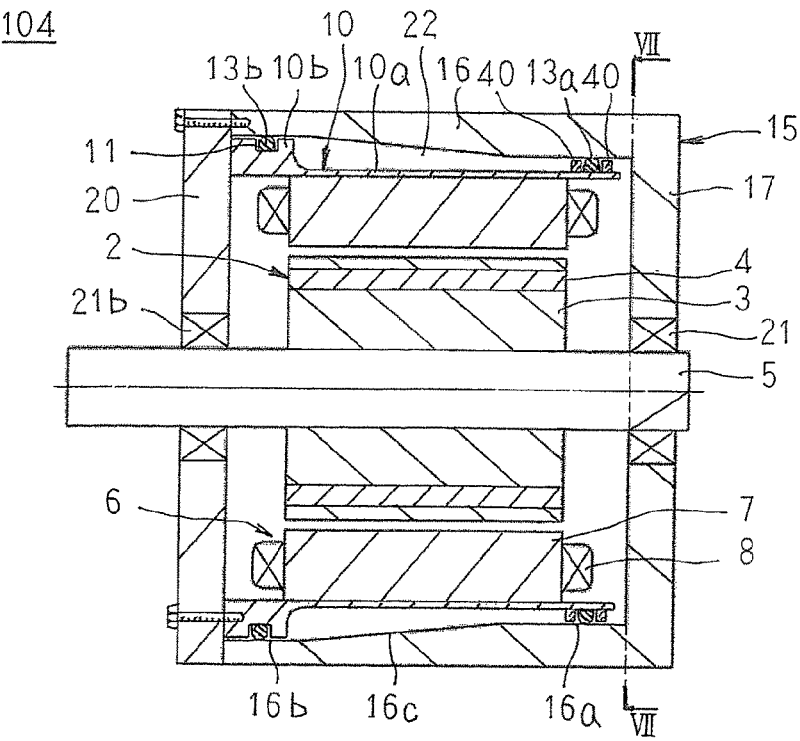
FIG. 6 is a cross section that shows a rotary electric machine according to Embodiment 5 of the present invention.
Figure 7:
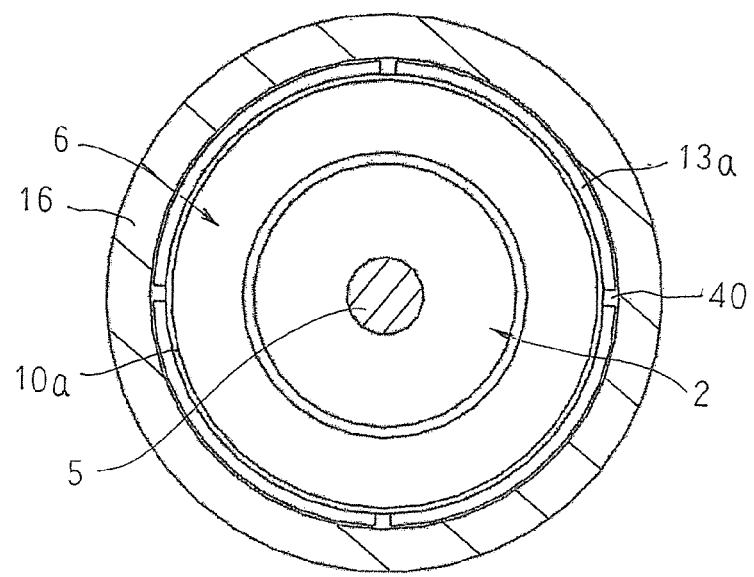
FIG. 7 is a cross section that is taken along Line VII-VII in FIG. 6 so as to be viewed in the direction of the arrows.

FIG. 6 is a cross section that shows a rotary electric machine according to Embodiment 5 of the present invention, and FIG. 7 is a cross section that is taken along Line VII-VII in FIG. 6 so as to be viewed in the direction of the arrows.

In FIGS. 6 and 7, a first position regulating portion is configured such that two rows in each of which four resin circular arc-shaped position regulating members 40 are arranged at a uniform angular pitch on a circumference of a common circle so as to be spaced apart from each other are fixed to a stator core housing portion 10a adhesively at a second axial end of an outer circumferential surface of the stator core housing portion 10a so as to be spaced apart in an axial direction.

Moreover, a rotary electric machine 104 according to Embodiment 5 is configured in a similar or identical manner to that of the rotary electric machine 100 according to Embodiment 1 above except that two rows in each of which four position regulating members 40 are arranged on the circumference of a common circle so as to be spaced apart from each other circumferentially are disposed so as to be spaced apart in an axial direction to constitute a first position regulating portion instead of the pair of annular position regulating members 12.

In Embodiment 5, because two rows of position regulating members 40 that are arranged on a circumference of a common circle so as to be spaced apart from each other circumferentially are disposed on a second axial end of an outer circumferential surface of a stator core housing portion 10a so as to be spaced apart in an axial direction to constitute a first position regulating portion, effects can be achieved in a similar or identical manner to Embodiment 1 above.

In Embodiment 5, because the resin circular arc-shaped position regulating members 40 are fixed adhesively onto the outer circumferential surface of the stator core housing portion 10a, mountability of the position regulating members 40 onto the stator core housing portion 10a is improved and yield is increased compared to Embodiment 1 above, in which metal annular position regulating members 12 are press-fitted onto the stator core housing portion 10a.

Because rigidity of the stator core housing portion 10a is increased when metal annular position regulating members 12 are press-fitted onto the stator core housing portion 10a, there was a risk that the inside diameter of the stator core 7 that is press-fitted into the stator core housing portion 10a might change. In Embodiment 5, because the circular arc-shaped position regulating members 40 are fixed adhesively onto the outer circumferential surface of the stator core housing portion 10a, increases in rigidity of the stator core housing portion 10a are suppressed, enabling changes in the inside diameter of the stator core 7 that is press-fitted into the stator core housing portion 10a to be suppressed.

In addition, because damage to the sealing surface of the stator core housing portion 10a that results from press-fitting the metal annular position regulating members 12 onto the stator core housing portion 10a does not occur, superior sealing reliability can be achieved.

Moreover, in Embodiment 5 above, resin position regulating members 40 have been used, but metal position regulating members may be used instead.

Embodiment 6

Figure 8:
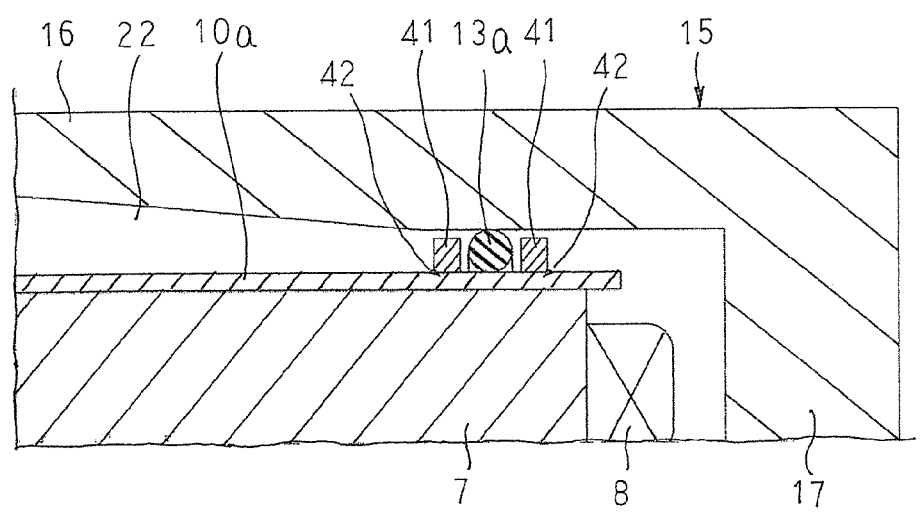
FIG. 8 is a partial cross section of a rotary electric machine according to Embodiment 6 of the present invention.

FIG. 8 is a partial cross section of a rotary electric machine according to Embodiment 6 of the present invention.

In FIG. 8, a pair of position regulating members 41 are produced into annular shapes using a ferrous material, for example, and are mounted to a second axial end of the outer circumferential surface of the stator core housing portion 10*a* in an externally fitted state so as to be spaced apart in an axial direction, and are fixed to the stator core housing portion 10*a* by welding on an opposite axial side from a first O-ring 13*a*, to constitute a first position regulating portion.

Moreover, the rest of the configuration is formed in a similar or identical manner to that of Embodiment 1 above.

In Embodiment 6, because a pair of position regulating members 41 are also mounted to a stator core housing portion 10*a* in a vicinity of a second axial end of an outer circumferential surface of the stator core housing portion 10*a* by press-fitting so as to be spaced apart in an axial direction to constitute a first position regulating portion, effects can be achieved in a similar or identical manner to Embodiment 1 above.

In Embodiment 6, because the pair of position regulating members 41 are welded to the stator core housing portion 10*a* on an opposite axial side from the first O-ring 13*a*, the welded portion 42 is separated from the sealing surface of the first O-ring 13*a*, enabling superior sealing performance to be achieved. Inside diameter precision of the position regulating members 41 can also be reduced, enabling cost reductions to be achieved.

Moreover, in Embodiment 6 above, a first position regulating portion is configured using a pair of annular position regulating members 41, but a first position regulating portion may be configured using a plurality of circular arc-shaped metal position regulating members that are arranged on the outer circumferential surface of the stator core housing portion 10*a* so as to be spaced apart from each other on the circumference of a common circle instead of the annular position regulating members 41. In that case, the plurality of metal position regulating members are each welded to the outer circumferential surface of the stator core housing portion 10*a* on an opposite axial side from the first O-ring 13*a*.

In Embodiment 6 above, a case in which a first position regulating portion is configured by welding a pair of position regulating members 41 to an outer circumferential surface of a stator core housing portion 10*a* has been explained, but this may also be applied to a case in which a second position regulating portion is configured by welding a pair of annular metal position regulating members to the frame mounting portion 10*b* instead of a O-ring housing groove 11. In that case, the pair of annular metal position regulating members are welded to the frame mounting portion 10*b* on an opposite axial side from the second O-ring 13*b*.

Embodiment 7

Figure 9:
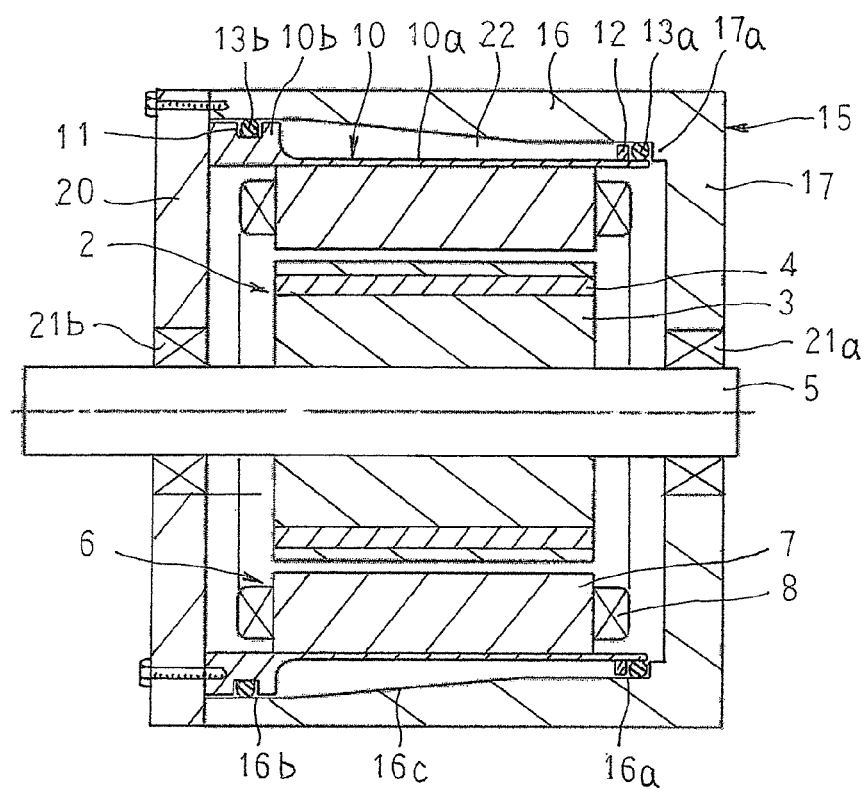
FIG. 9 is a cross section that shows a rotary electric machine according to Embodiment 7 of the present invention.

FIG. 9 is a cross section that shows a rotary electric machine according to Embodiment 7 of the present invention.

In FIG. 9, a position regulating member 12 is press-fitted onto and held by a vicinity of a second axial end of an outer circumferential surface of a stator core housing portion 10*a*, and a first O-ring 13*a* is mounted onto a vicinity of the second axial end of the outer circumferential surface of the stator core housing portion 10*a* so as to be sandwiched between the position regulating member 12 and a stepped portion 17*a* that is disposed so as to protrude from a bottom portion 17 of a housing case 15.

Moreover, a rotary electric machine 105 according to Embodiment 7 is configured in a similar or identical manner to that of the rotary electric machine 100 according to Embodiment 1 above except that the first O-ring 13*a* is mounted onto the stator core housing portion 10*a* so as to be sandwiched between the position regulating member 12 and the stepped portion 17*a* of the bottom portion 17 of the housing case 15.

In Embodiment 7, because a first position regulating portion is formed by a position regulating member 12 and a stepped portion 17*a*, effects can be achieved in a similar or identical manner to Embodiment 1 above.

According to Embodiment 7, because a first position regulating portion is formed by one position regulating member 12 and a stepped portion 17*a* that is disposed so as to protrude from the bottom portion 17 of the housing case 15, the number of parts can be reduced.

Moreover, in Embodiment 7 above, a stepped portion 17*a* that is disposed so as to protrude from a bottom portion 17 of a housing case 15 is used as a position regulating member, but a stepped portion that is disposed so as to protrude from a cylindrical portion 16 of the housing case 15 so as to face a position regulating member 12 in an axial direction may alternatively be used as a position regulating member.

The invention claimed is:

1. A rotary electric machine comprising:
a stator that includes: a stator core; and
a stator coil that is mounted to said stator core;
a frame that holds said stator internally by fitting together with and fixing said stator core;
a first O-ring and a second O-ring that are mounted to an outer circumferential surface of said frame so as to be spaced apart in an axial direction; and
a housing case that houses said frame and said stator,
said first O-ring and said second O-ring being pressed and held by direct contact with a surface of said frame and a surface of said housing case such that a coolant channel is formed between said frame and said housing case,
said frame attached to said housing case only at an end portion of said frame near said second O-ring;
wherein axial movement of said first O-ring is restricted by a plurality of position regulating members that are constituted by a separate member from said frame and said housing case, said position regulating members being fixed to said frame so as to be disposed on an outer circumferential surface of said frame so as to be spaced apart in said axial direction so as to sandwich said first O-ring.

2. The rotary electric machine according to claim 1, wherein said frame is formed so as to have a uniform thickness.

3. The rotary electric machine according to claim 1, wherein said position regulating members are fixed to said frame by welding on an opposite axial side from said first O-ring.

4. The rotary electric machine according to claim 1, wherein at least one of said position regulating members comprises a plurality of members that are fixed to said frame so as to be arranged spaced apart from each other in a circumferential direction on a common circle on said outer circumferential surface of said frame.

5. The rotary electric machine according to claim 1, wherein said first O-ring and said position regulating members are positioned radially outside a housing region of said stator core in said frame.

6. The rotary electric machine according to claim 1, wherein:
- a guiding portion that guides interfitting of said stator core is configured by forming a vicinity of an end portion of an inner circumferential surface of said frame near said first O-ring into a splayed inclined surface; and
- a stator core press-fitting interfitting surface is formed on a region of said inner circumferential surface of said frame that is positioned between said guiding portion and said position regulating member in the axial direction.

7. The rotary electric machine according to claim 1, wherein a frame mounting portion is formed integrally on the end portion of said frame near said second O-ring.

8. The rotary electric machine according to claim 7, wherein said second O-ring is mounted onto an outer circumferential surface of said frame mounting portion.

9. The rotary electric machine according to claim 1, wherein a frame mounting member is joined together with the end portion of said frame near said second O-ring.

10. The rotary electric machine according to claim 1, wherein axial movement of said second O-ring is restricted by a separate member from said frame.

* * * * *